United States Patent [19]

Gebo et al.

[11] Patent Number: 4,836,293

[45] Date of Patent: Jun. 6, 1989

[54] SHIELDING METHOD FOR USE WITH ELECTROMAGNETIC BALANCE

[75] Inventors: Charles H. Gebo; Bradley C. Roth, both of Rochester, N.Y.

[73] Assignee: Eastman Kodak Company, Rochester, N.Y.

[21] Appl. No.: 273,773

[22] Filed: Nov. 21, 1988

[51] Int. Cl.$^4$ ............................................. G01G 7/00
[52] U.S. Cl. ......................................... 177/1; 177/212
[58] Field of Search ..................... 177/1, 210 EM, 253, 177/262, 212

[56] References Cited

U.S. PATENT DOCUMENTS

| | | | |
|---|---|---|---|
| 1,953,819 | 4/1934 | Payne . | |
| 3,519,095 | 7/1970 | Tomes | 177/210 |
| 4,067,408 | 1/1978 | Dodds et al. | 177/210 C |
| 4,090,575 | 5/1978 | Kunz et al. | 177/210 EM |
| 4,150,730 | 4/1979 | Knothe et al. | 177/212 |
| 4,545,448 | 10/1985 | Kunz | 177/212 |
| 4,619,337 | 10/1986 | Behrend et al. | 177/210 R |

FOREIGN PATENT DOCUMENTS 3136049  3/1983  Fed. Rep. of Germany .

*Primary Examiner*—George H. Miller, Jr.
*Attorney, Agent, or Firm*—William C. Dixon

[57] ABSTRACT

For use with weighing apparatus of the electromagnetic-load-compensation type, where a stirring or other magnet creating an external magnetic field is disposed near such apparatus, a protective shield is interposed between that magnet and the apparatus, in flux-transmitting relation to the magnet, so as to shield the apparatus from the externally created field. The shield is formed from ferromagnetic material of sufficiently high permeability of provide a path of least reluctance for transmitting flux from the external field, thereby preventing such flux from interfering with intended operation of the apparatus.

16 Claims, 3 Drawing Sheets ical-load-compensation
type, and particularly to a shielding method for use
therewith to render its weight measurements immune to
magnetic interference.

SHIELDING METHOD FOR USE WITH ELECTROMAGNETIC BALANCE

BACKGROUND OF THE INVENTION

1. Field of the Invention

The present invention relates generally to weighing apparatus of the electromagnetic-load-compensation type, and particularly to a shielding method for use therewith to render its weight measurements immune to magnetic interference.

2. Description of the Prior Art

Weighing apparatus of the electromagnetic-loadcompensation type are well known. Shielding means for protecting such apparatus from stray magnetic flux produced internally by the permanent magnet system within such apparatus also are known. For example, U.S. Pat. No. 4,090,575 discloses weighing apparatus of the foregoing type having a magnetically conductive shield for protecting its compensation coil from such internally generated flux. Also, U.S. Pat. No. 4,545,448 discloses weighing apparatus of the same type having its compensation coil enclosed by magnetically conductive parts of the permanent magnet system itself, to eliminate stray flux which otherwise might result from that system, and thereby preclude any adverse interaction between such flux and nearby ferromagnetic objects.

While such known shielding means may have sufficed for the purpose of protecting the load-compensation coil of such apparatus from adverse effects of internally created magnetic flux, there has remained a persistent need for an effective way to shield, not only the compensation coil, but all parts of such apparatus from interference that could be caused by external sources of magnetic flux. A common example of an external source is a stirring magnet used with a mass to be weighed in a container therefor on the apparatus weighing pan. It has been found that the magnetic field created by a stirring magnet interferes adversely with the weight-measuring function of such apparatus, and thus causes significant weighing errors. Although magnetic stirrers have been widely used for some time, and the need to eliminate such errors has been well recognized, a practical and efficient way to meet that need, without adversely affecting the apparatus itself or its intended operation, has not been realized until the advent of this invention.

SUMMARY OF THE INVENTION

Accordingly, a primary objective of this invention has been to meet the foregoing need to eliminate measuring errors resulting from an externally created magnetic field. Another objective has been to do so in a totally reliable, practical, and economical manner. These and other objectives have been achieved by the invention herein disclosed and claimed.

This invention finds utility as a protective shielding method devised for use with weighing apparatus of the electromagnetic-load-compensation type in order to render its weight measurements immune to interference by magnetic flux from a source thereof external to the apparatus. Such apparatus includes stationary magnet means located within the apparatus and having an air gap, a compensation coil operatively disposed for movement in said gap, carrying means supporting the coil and mounted for movement relative to the stationary magnet means away from and back to an initial position, and means responsive to carrying means movement away from its initial position for supplying current to the coil to return the carrying means to said position, the carrying means being adapted to support a load to be weighed. The protective shielding method of this invention comprises positioning a magnetically conductive shield between the carrying means and the source of magnetic flux, in flux-transmitting relation to said source, so as to shield the apparatus from said flux, the shield being formed from ferromagnetic material having sufficient permeability to provide a path of least reluctance for transmitting said flux and thereby preventing that flux from interfering with intended operation of the apparatus.

This invention, and its objects and advantages, will become more apparent in the detailed description of the illustrated embodiments thereof presented hereinbelow.

BRIEF DESCRIPTION OF THE DRAWINGS

In the detailed description of the embodiments of this invention presented below, reference is made to the accompanying drawings, wherein like reference characters denote like elements, and wherein.

DESCRIPTION OF THE ILLUSTRATED EMBODIMENTS

Because certain parts of, and practices relating to weighing apparatus of the electromagnetic-load-compensation type are well known, the following description is directed in particular to those elements and steps forming or cooperating directly with this invention. Elements and steps not specifically shown or described herein are selectable from those known in the relevant art.

Figure 1:
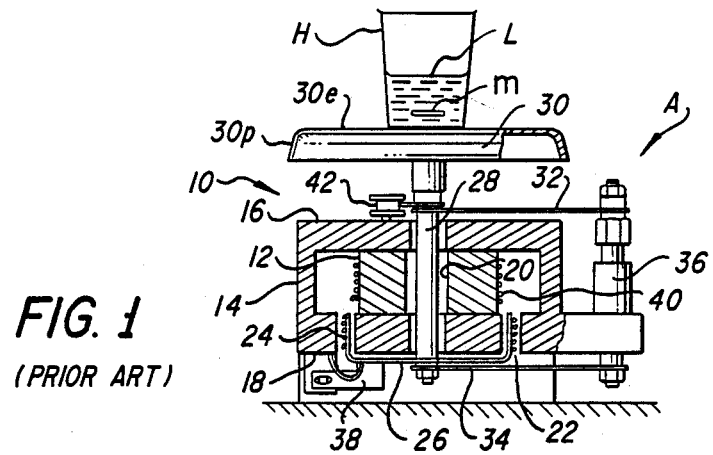
FIG. 1 is an elevational view, mostly in cross section, illustrating operative components of weighing apparatus of the electromagnetic-load-compensation type as known in the prior art.

FIG. 1 illustrates the principal operative components of prior-art weighing apparatus of the electromagnetic-load-compensation type, such apparatus being commonly referred to as an electromagnetic, or electronic, balance. The apparatus, designated generally by the letter A, comprises stationary magnetic circuit means 10 including a cylindrical permanent magnet 12, a ferromagnetic annular member 14 arranged in concentric spaced relation to permanent magnet 12, a ferromagnetic upper plate 16, and a ferromagnetic base plate 18. A central bore 20 extends vertically through magnetic circuit means 10 as shown. Base plate 18 contains an annular air gap 22 which receives, for axial movement therein, a load-compensation coil 24. Coil 24 is wound upon an upstanding flange portion of a dish-shaped coil support member 26, which may be formed from a suitable synthetic plastic material. A vertical carrying member 28 is connected, at its lower end, to a horizontal central portion of coil support member 26, extends upwardly through central bore 20, and projects above plate 16 so as to support, at its upper end, a weighing pan 30. Carrying member 28 is guided for vertical movement, relative to magnetic circuit means 10, by resilient upper and lower guide means 32 and 34. The right ends of guide means 32 and 34 are connected to a stationary vertical column 36 that is bolted to an extension of base plate 18. Disposed on weighing pan 30 is a holding means H containing a mass L to be weighed. The mass L shown is a liquid, and a stirring magnet m is immersed therein.

In operation, the gravitational force due to the combined weights of holding means H, mass L, and magnet m on pan 30 causes downward movement of carrying member 28 (guided by guide means 32 and 34) from its initial position. An optical/electronic scanning system 38 senses such movement of member 28 and transmits a signal, in the form of a voltage change, to associated electronic circuitry (not shown) in the apparatus. The electronic circuitry, in turn, amplifies the current flowing through coil 24 so that the resulting counterforce generated in conjunction with permanent magnet 12 returns member 28 to its initial position. The amount of current required to keep member 28 in that position generally is proportional to the total weight on pan 30. Should localized temperature increase, however, the restoring magnetic force becomes weaker. Therefore, a second, temperature-compensating coil 40 is provided to act as a temperature sensor and counteract that effect by increasing the amount of current flowing through load-compensation coil 24. A mechanical stop means 42 also is provided, to protect the weight-measuring system against any shock or overload condition.

The apparatus described thus far with reference to FIG. 1 is illustrative of known weighing apparatus of the electromagnetic-load-compensation type. While such apparatus has operated successfully in some applications, a problem has been encountered whenever an externally created magnetic field has existed nearby. A common example of that situation is the magnetic field produced by a stirring magnet such as magnet m in FIG. 1. The field of a stirring magnet may be sufficiently strong to interfere with intended operation of the apparatus, and thus cause significant weighing errors. That problem has now been resolved by the shielding method of this invention.

Figure 2:
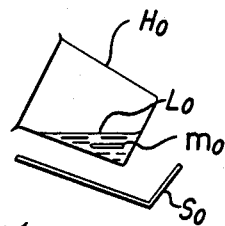
FIG. 2 is an elevational view of a protective shield as configured for use, according to one embodiment of this invention, with the apparatus of FIG. 1.
Figure 3:
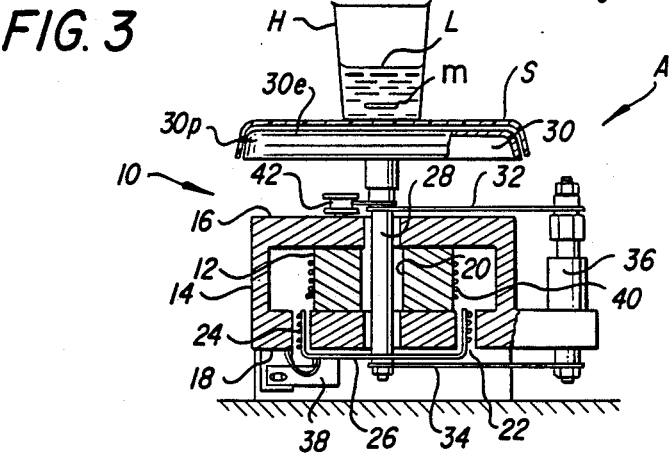
FIG. 3 is a cross-sectional elevation similar to FIG. 1 but showing the apparatus with the shield of FIG. 2 operatively positioned thereon.

The invention comprises a protective shielding method devised for use with such apparatus to render its weight measurements immune to external magnetic interference, and therefore more accurate. In the context of an external magnetic field produced by stirring magnet m, this method entails positioning a magnetically conductive shield between carrying member 28 and holding means H, in flux-transmitting relation to magnet m, so as to shield the apparatus from the field of magnet m. Such a shield, according to one embodiment of this invention, is depicted in FIGS. 2 and 3 as an inverted-dish-shaped shield S. Shield S is formed from a ferromagnetic material having sufficiently high permeability to provide a path of least reluctance for transmitting flux from that external field and thereby preventing such flux from interfering with the apparatus. Typical examples of commercially available high-permeability material are sold under the trademarks "Mumetal", "78 Permalloy", and "Supermalloy". In general, any ferromagnetic material of such high permeability should possess the qualities required of shield S.

It has been found that the reluctance of such ferromagnetic material is several orders of magnitude less than that of any path which magnetic flux from magnet m would have to follow to interfere significantly with the weighing apparatus. Thus, when shield S is in place, magnetic flux from magnet m takes the path of least reluctance available to it, viz., that through the high-permeability shield material, and such flux therefore does not interact with the apparatus. FIG. 3 shows the weighing apparatus of FIG. 1 with shield S configured and positioned so as to rest on the top exterior surface 30e of pan 30, and, in turn, to support holding means H. It will be seen that, when so placed, shield S is configured and positioned to overlie pan 30 in covering relation to exterior surface 30e. Preferably, in addition to covering all of that surface, shield S also is configured and positioned to cover at least part of the pan's peripheral surface 30p, as shown. Shield S need not be attached to pan 30; it may simply be manually placed upon the pan.

Figure 4:
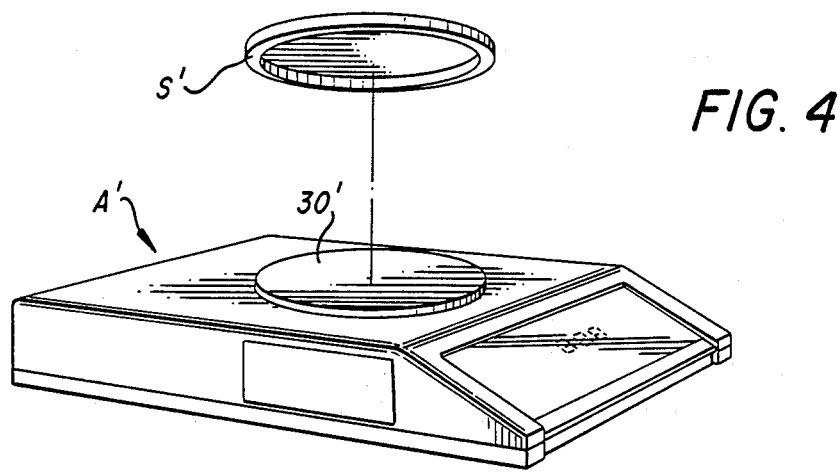
FIG. 4 is a pictorial perspective view of weighing apparatus similar to that depicted in FIGS. 1 and 3, showing such apparatus with a circular weighing pan and a conforming circular shield disposed above the pan for positioning thereon.
Figure 5:
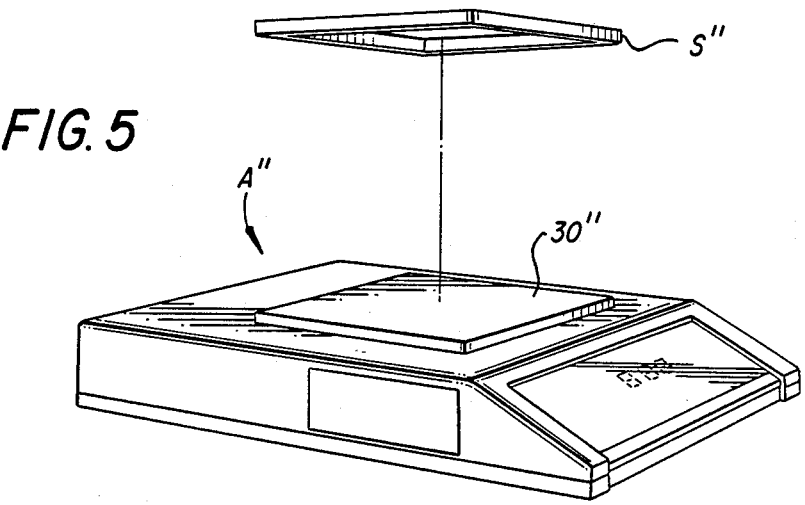
FIG. 5 is a pictorial perspective view similar to FIG. 4 but showing such apparatus with a rectangular weighing pan and a conforming rectangular shield disposed above the pan for positioning thereon.

FIGS. 4 and 5 are pictorial views illustrating two embodiments of the weighing apparatus and protective shields configured for use therewith. In FIG. 4, the apparatus A' has a circular weighing pan 30', and shield S' is conformingly circular. In FIG. 5, the apparatus A" has a rectangular pan 30", and shield S" is conformingly rectangular. In each case, the shield is configured to have a peripheral contour conforming with that of the weighing pan.

In developing a protective shield suitable for practicing the method of this invention, a prototype thereof was made from the above-described "Mumetal" material, and was tested in use with three different brands of electromagnetic weighing apparatus X, Y, and Z. True readings were first determined by providing several inches of physical separation between the mass holding means containing a stirring magnet and the weighing pan of each apparatus. Comparison readings were taken with and without the protective shield placed between the holding means and the pan. In those tests, large stirring magnets were used in 800-cubic-centimeter cans, and small stirring magnets in 125-cubic-centimeter cans. In all instances, readings taken with the protective shield in place were found to be identical to the previously determined true readings. Typical results of these tests are summarized in the following table, wherein all readings are expressed in grams.

| Brand | Using Large Magnet | | | Using Small Magnet | | |
|---|---|---|---|---|---|---|
| | Without Shield | With Shield | Error | Without Shield | With Shield | Error |
| X | 216.43 | 215.43 | +1.00 | 86.97 | 86.76 | +0.21 |
| Y | 218.70 | 215.50 | +3.20 | 87.30 | 86.80 | +0.50 |
| Z | 217.81 | 215.45 | +2.36 | 87.12 | 86.77 | +0.35 |

Regardless of the brand of apparatus or size of magnet used, it was found that the magnitude of each weighing error is a function of, and varies with changes in, the magnet's location and orientation relative to its weighing pan, so that any such error cannot be eliminated simply by taring.

Further to the above tests, weighing readings also were taken when another holding means $H_o$, containing an additional mass $L_o$ to be weighed and another stirring magnet $m_o$ immersed therein, was held above holding means H as shown in FIG. 3. In this situation, it was found that the magnetic field created by magnet $m_o$ was sufficiently strong to exert a lifting force on shield S on pan 30, causing minute movements of shield S, and consequently unstable readings. To avert such interaction, another protective shield $S_o$ was interposed between the two holding means as shown in FIG. 3. Shield $S_o$ was formed from the same "Mumetal" material as was shield S, and had sufficient permeability to transmit flux from magnet $m_o$ and thereby prevent that flux from interacting with shield S. Alternatively, such shielding material could be held against or otherwise applied to holding means $H_o$ itself, and thereby achieve the same beneficial result.

While the above-described tests dealt with magnetic fields created by stirring magnets disposed near the weighing apparatus, it is recognized that magnetic fields produced by other externally located sources could also adversely affect weight-measuring accuracy, and that such magnetic fields could be handled in a similar manner using appropriately configured protective shielding means operatively positioned between the magnetic field source and the weighing apparatus.

Figure 6:
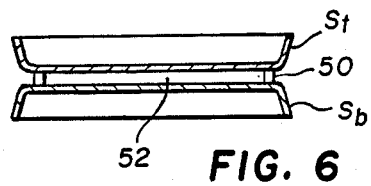
FIG. 6 is a cross-sectional elevation of a protective shield as constructed in accordance with another embodiment of this invention.

For example, should the external magnetic field source include one or more unusually strong magnets, protective shielding capacity could be increasing by using multiple sheets of high-permeability material interspersed with gaps of air or some other high-reluctance medium. A simplified version of such a scheme is illustrated in FIG. 6, wherein superposed top and bottom shields $S_t$ and $S_b$ of high-permeability material, such as "Mumetal", are separated by one or more non-magnetic spacers 50 to provide an air gap 52 between the two shields. With this arrangement in use near a strong external magnet, any flux therefrom that is not confined to the top shield $S_t$ must first bridge the high-reluctance air gap 52 and then pass through the bottom shield $S_b$ before reaching the weighing apparatus below. Obviously, more shielding layers and gaps could be employed to increase the shielding capacity even more.

Figure 7:
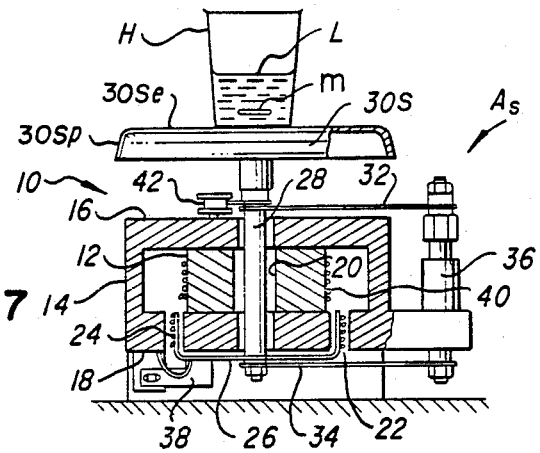
FIG. 7 is a cross-sectional elevation similar to FIG. 3 but showing the apparatus as modified to incorporate the shield of FIG. 2.
Figure 8:
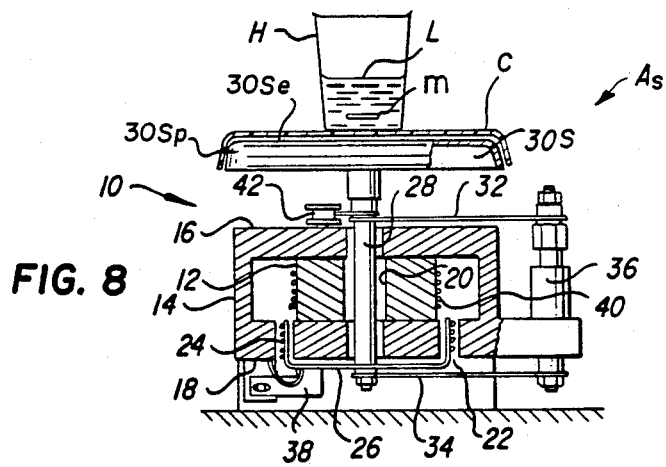
FIG. 8 is a cross-sectional elevation similar to FIG. 7 but showing a protective cover placed over the shield.

Sill another embodiment of this invention is depicted in FIGS. 7 and 8. Here, instead of using a separate shielding means such as shield S on top of the apparatus weighing pan as shown in FIG. 4, a similar shield 30S, having top and peripheral surfaces 30S$e$ and 30S$p$, respectively, is used in place of the pan. Shield 30A thus is supported directly by carrying member 28, as was pan 30 in FIG. 3, with the same beneficial shielding result as described in reference to that figure. FIG. 7 shows a holding means H (holding mass L and magnet m therein) placed directly on shield top surface 30S$e$ in position for weighing.

FIG. 8 shows an optional protective cover C on shield top surface 30S$e$, with holding means H operatively disposed atop the cover. Cover C preferably is formed from a readily cleanable corrosion-resistant material, such as stainless steel, to protect the shield from chemical spillage. Such a cover could be pan 30 itself provided the shield 30A is suitably configured to fit thereunder. Conveniently, shield 30A need not be attached to carrying member 28 or to cover C; they both may simply be placed in their operative positions shown.

The present invention has now been described in detail with particular reference to embodiments thereof illustrated herein. It will be understood, however, that variations and modifications can be effected within the spirit and scope of this invention.

We claim:

1. A method for rendering weighing apparatus of the electromagnetic-load-compensation type immune to interference by magnetic flux from a source thereof external to the apparatus, such apparatus including stationary magnet means located within the apparatus and having an air gap, a compensation coil operatively disposed for movement in said gap, carrying means supporting said coil and mounted for movement relative to said stationary magnet means away from and back to an initial position, and means responsive to carrying means movement away from said initial position for supplying current to said coil to return said carrying means to said position, said carrying means being adapted to support a load to be weighed, said method comprising:

positioning protective shield means between said carrying means and said source of magnetic flux, in flux-transmitting relation to said source, so as to shield the apparatus from said flux, said shield means being formed from ferromagnetic material having sufficient permeability to provide a path of least reluctance for transmitting said flux and thereby preventing said flux from interfering with intended operation of the apparatus.

2. The method claimed in claim 1 wherein said shield means is adapted to be supported by said carrying means in overlying relation to said stationary magnet means and to support said load; and wherein said positioning includes positioning said shield means on said carrying means for support thereby so as to overlie said stationary magnet means and underlie said load.

3. The method claimed in claim 2 wherein said load includes means holding a mass to be weighed and said source of magnetic flux; and wherein said positioning includes positioning said holding means on said shield means for support thereby and to effect said flux-transmitting relation between said shield means and said source.

4. The method claimed in claim 1 wherein said shield means includes first and second superposed elements of high-permeability ferromagnetic material separated by a high-reluctance medium; and wherein said positioning includes positioning said shield means so that said first element overlies said carrying means and said second element underlies said source of magnetic flux.

5. A method for rendering weighing apparatus of the electromagnetic-load-compensation type more immune to magnetic interference, such apparatus including a weighing pan movably mounted thereon, stationary magnet means located within the apparatus and having an air gap, a compensation coil operatively disposed for movement in said gap, carrying means supporting said pan and said coil and mounted for movement relative to said stationary magnet means away from and back to an initial position, and means responsive to carrying means movement away from said initial position for supply current to said coil to return said carrying means to said position, said pan having an exterior surface adapted to support means for holding a mass to be weighed and an added magnet that creates a magnetic field external to the apparatus, said method comprising:

positioning protective shield means between said carrying means and said holding means, in flux-transmitting relation to said added magnet, so as to shield the apparatus from said external field created by said magnet, said shield means being formed from ferromagnetic material having sufficient permeability to provide a path of least reluctance for transmitting flux from said field, thereby preventing said flux from interfering with intended operation of the apparatus.

6. The method claimed in claim 5 wherein said positioning comprises positioning said shield means between said pan and said holding means.

7. The method claimed in claim 6 wherein said shield means is configured and positioned so as to overlie said pan in covering relation to said exterior surface.

8. The method claimed in claim 7 wherein said shield means is configured and positioned so as to rest on top of said exterior surface and to support said holding means.

9. The method claimed in claim 8 wherein said shield means is configured and positioned so that its peripheral contour is in conforming relation to that of said pan.

10. The method claimed in claim 9, said pan further having a peripheral surface substantially perpendicular to said exterior surface, wherein said shield means is configured and positioned so as to cover all of said exterior surface and at least part of said peripheral surface.

11. The method claimed in claim 10 wherein said shield means is manually positioned on said pan.

12. The method claimed in claim 5 wherein said positioning comprises positioning said shield means between said carrying means and said pan.

13. The method claimed in claim 12 wherein said shield means is configured and positioned so as to overlie said stationary magnet means in covering relation thereto and to support said pan.

14. The method claimed in claim 5 wherein said positioning comprises positioning said shield means on said carrying means in place of said pan.

15. The method claimed in claim 14 wherein said shield means is configured and positioned so as to overlie said stationary magnet means in covering relation thereto and to support said holding means.

16. The method claimed in claim 5, for rendering the apparatus more immune to magnetic interference when another source of magnetic flux external thereto is disposed near said holding means, said method further comprising interposing additional protective shield means between said other source of magnetic flux and said holding means, in flux-transmitting relation to said other source, so as to shield the protective shield means positioned between said carrying means and said holding means from the flux produced by said other source, said additional shield means having sufficient permeability to transmit said flux from said other source and thereby prevent that flux from interacting with said shield means positioned between said carrying means and said holding means.

\* \* \* \* \*